May 1, 1928.

C. H. COLVIN 1,667,840

INSTRUMENT FOR INDICATING DIRECTION OF FORCES

Filed May 24, 1919     2 Sheets-Sheet 1

INVENTOR.
Charles H Colvin
BY
J.C. Ledbetter
ATTORNEY

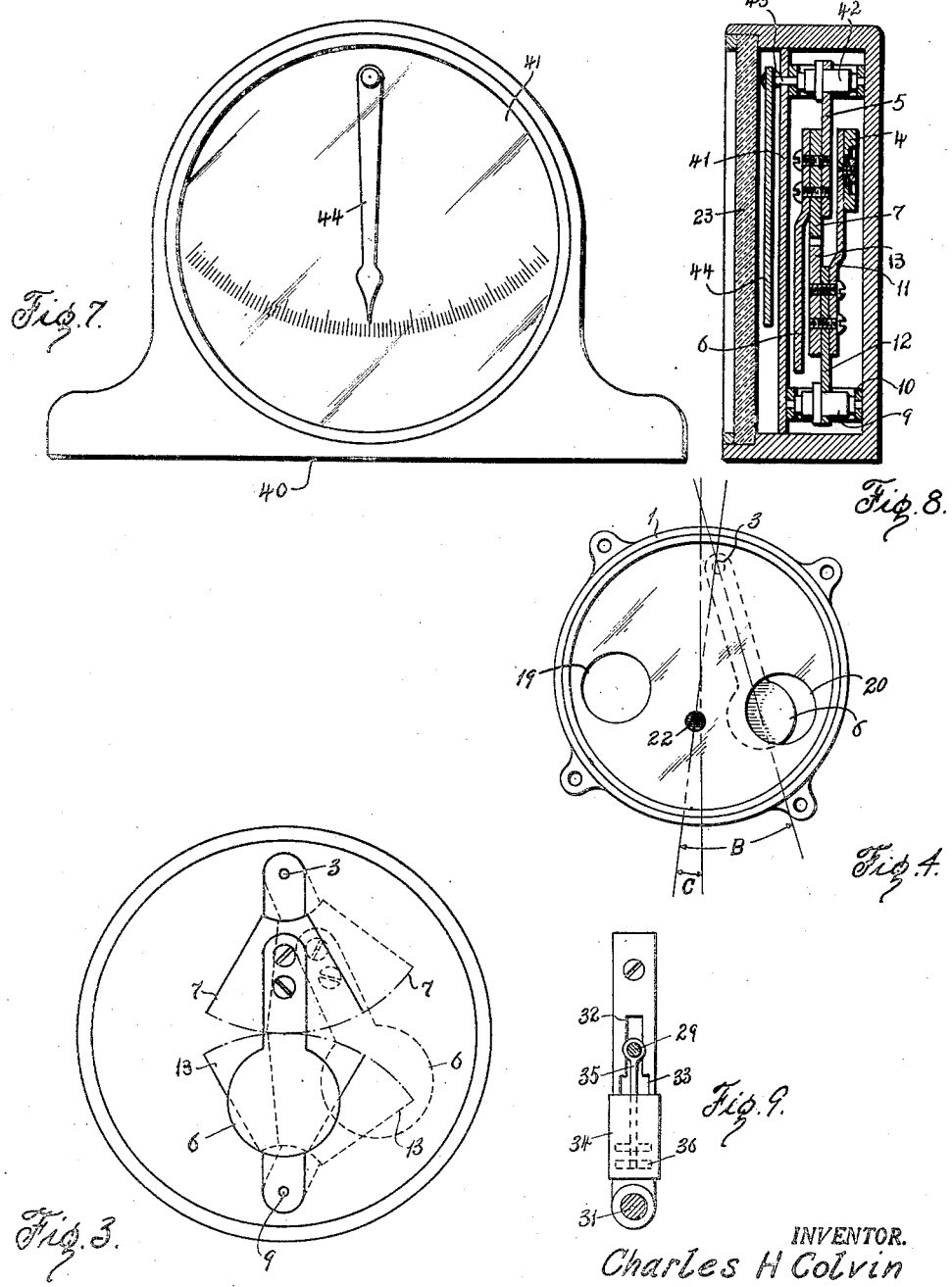

Patented May 1, 1928.

1,667,840

UNITED STATES PATENT OFFICE.

CHARLES H. COLVIN, OF BROOKLYN, NEW YORK.

INSTRUMENT FOR INDICATING DIRECTION OF FORCES.

Application filed May 24, 1919. Serial No. 299,447.

This invention relates to instruments for indicating the direction of forces. More particularly it refers to instruments known as banking indicators for use on airplanes.

An object of the invention is to provide an instrument for use on airplanes which will indicate whether the airplane is flying in a laterally correct attitude.

A further object of the invention is to provide a form of banking indicator which may be installed on an airplane in view of the pilot, and which will indicate continually the correct lateral attitude of the airplane, whether flying on a straight or a curved course.

A still further object of the invention is to provide a form of banking indicator for use on airplanes for indicating the correctness of the lateral attitude of the airplane, with indicating means so arranged that a large indication will be given for a small error in the lateral attitude of the airplane.

It is also an object of this invention to provide an instrument for indicating the direction of forces acting upon it, giving a large angular indication for a small angular change in the direction of the force.

It is also an object of this invention to provide an instrument which will function as a super-pendulum, or an instrument of small size having pendulous characteristics similar to those of a long pendulum; that is, a large movement of the indicating means for a small angular displacement.

Before proceeding to describe the invention in further detail, an explanation should be given of what is meant by the "direction of force" and by the "correct lateral attitude" of an airplane.

All objects are subject to forces, the force normally acting upon them being gravity, which acts downward, or toward the center of the earth. Bodies in motion, however, may have additional forces acting upon them, such as centrifugal force when traveling on a curved path. It is frequently desirable to ascertain with accuracy the direction of existing forces, or of their resultant force if more than one force is acting. This is particularly the case in an airplane because the "correct lateral attitude" is a position such that the resultant of all forces acting on the airplane lies in a plane at right angles to the lateral axis of the airplane. An instrument for indicating the direction of the resultant of the existing forces in the lateral plane is known to those versed in the art as a banking indicator, although it indicates the correctness of the lateral attitude whether the airplane is banked or flying straight.

With the before stated and other objects in view the invention has relation to a certain arrangement of parts, examples of which are described in the following specification, pointed out in the appended claims, and illustrated in the accompanying drawings, wherein:

Figure 3 shows a front diagrammatic view of the instrument; one position being shown in solid lines and another position being shown in dotted lines.

Figure 4 shows a front view of the instrument wherein the instrument has been revolved slightly in respect to the force acting upon it.

Figure 7 shows a modified design of the instrument, with a different type of indicating means.

Figure 8 shows a vertical sectional view taken through Figure 7.

Figure 9 shows a detailed view of one of the pendulous elements of the instrument, the view being taken upon the line 10—10 of Figure 6.

Figure 1:
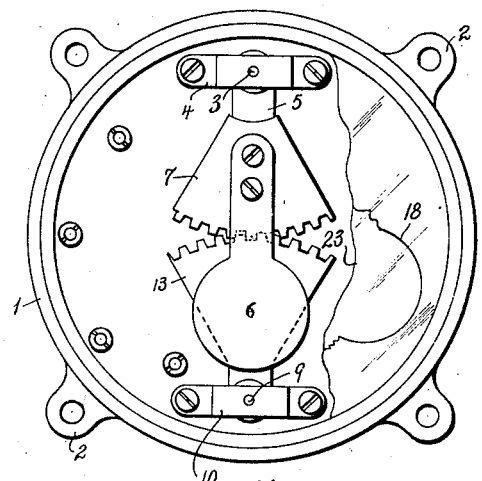
Figure 1 shows a front view of the instrument with parts thereof broken away so as to expose the operative mechanism of the instrument.
Figure 2:
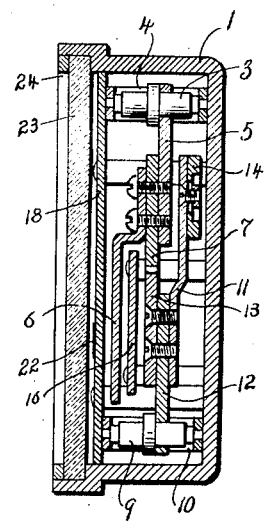
Figure 2 illustrates a vertical sectional view taken through the center of Figure 1.

Figures 1, 2, 3, 4, 5, and 6, refer particularly to the instrument as used as a banking indicator for airplanes, and Figures 7 and 8 refer particularly to the instrument as used as a device for measuring angles in relation to the vertical.

Referring now more in particular to the drawings, wherein the same parts throughout the several views are designated by the several reference characters, the numeral 1 points out the casing in which the instrument is contained. This casing 1 is provided with ears 2 for fastening the instrument upon an instrument board.

A bracket 4 which is secured to the case 1, has journalled within it a shaft 3 which carries a simple pendulum comprising a hanger 5 and a pendant 6, the lower end or head of which is round in shape. A gear sector 7 is attached to the pendulum, and in this instance is shown interposed between the pendant 6 and the hanger 5, the three parts being secured together by screws or rivets. The simple pendulum comprising members 5, 6 and 7 fitted upon the shaft 3, is adapted to swing freely in the bearings of the bracket 4.

A bracket 10 which is secured to the case 1 has journaled within it a shaft 9 which is substantially parallel to the shaft 3. This shaft 9 carries an inverted pendulum comprising an upstanding arm 12 to which is attached a weighted member 11 and a gear sector 13, which engages with the gear sector 7. The inverted pendulum comprising members 11, 12, and 13, is held together by screws or rivets, and is fitted on the shaft 9 so that it can swing in the bracket 10 in a plane substantially parallel to the plane of the simple pendulum. The weighted member 11 carries on the upper end thereof a weight 14. This weight is slotted and fitted with an adjusting screw which permits the weight to be displaced in upwardly or downwardly position.

This invention involves principles founded on the operative combination of a simple pendulum with an inverted pendulum, and by "simple pendulum" is meant an ordinary pendulum consisting of a hanger swung on a point with a weight on the hanger below the pivot point. Construing the term "inverted pendulum", I define it as an arm with a weighted end swung on a pivot, the weight being carried above the pivot.

An opaque, or sheet metal, cover plate 18 is placed in the casing of the instrument. This cover plate may be supported upon posts provided for that purpose. This cover plate is provided with a pair of symmetrically arranged view openings 19 and 20 cut in the sheet metal cover. These view openings are formed in the cover plate in such position as to expose the pendant head in the extreme positions of its swing, and the diameter of the view openings are substantially equal to the diameter of the lower portion of the pendant 6. A reference spot 22 is painted or otherwise made on the cover plate between the openings 19 and 20, the purpose of which will later appear. A glass cover 23 is placed in the casing and secured therein by a retaining ring 24. A plate 16 is placed between the pendant 6 and the gear sectors 7 and 13, to prevent all moving parts except the pendant 6 being seen through the openings 19 and 20 of the opaque plate 18.

I have therefore produced a banking indicator wherein an operating means including gears 7 and 13 is connected with an indicator 6 to actuate the latter by reason of force applied to the instrument; and means including the inverted pendulum 14 is connected with the operating means for increasing the movement of the indicator 6 or any other when the force is applied. In this way the indicator is displaced through a greater number of degrees than that of the aircraft on which the device is mounted, so that the indicator shows a large indication for a small lateral error of flight attitude of the craft. This principle of the invention and mode of operation is also brought out in modified forms of the invention which will now be described.

Figure 5:
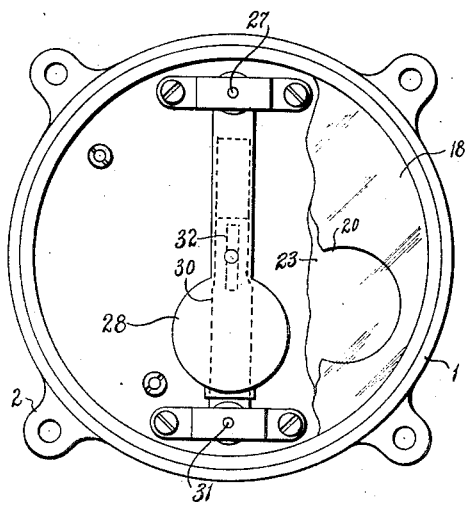
Figure 5 shows a front view of a modified form of the instrument.
Figure 6:
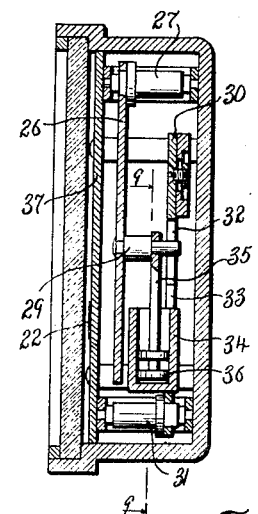
Figure 6 shows a vertical sectional view taken through Figure 5.

Figures 5 and 6 show a modified design of the instrument. A simple pendulum 26 is carried upon a shaft 27 journaled in a bracket fixed within the casing. The lower portion of this pendulum is provided with a pendant round or disk-shaped extremity 28. The pendulum is fitted with a pin 29 securely attached or riveted over in a bore formed in the pendulum. An inverted pendulum 30 is fitted to a shaft 31 journaled in a bracket secured in the casing. This inverted pendulum is provided with a slot 32 in which the free extremity of the pin 29 is movably confined. The slot 32 is enlarged at 33, and a small open ended cylinder 34 is placed in the slot and soldered or otherwise adequately secured therein. A small piston rod 35 fitted with a piston 36 is carried on the pin 29 with the piston reciprocatively contained within the cylinder. A cover plate 37 is provided in a similar manner to the instrument heretofore described. The cover plate is provided with view openings 19 and 20 as previously described.

It will be preferable to have the cover plates 16 and 18 of the instruments painted black, and the swinging indicating means as pendants 6 and 28, painted white. so that there will be a distinct visual impression made by the appearance of the indicating means through openings 19 and 20. Any dissimilar colors may, however, be employed. It may be preferable to use luminous paint on the indicator so that its appearance is easily seen at night. The small spot 22 is painted the same color as the indicator, or with luminous material. so that it may be instantly appreciated on which side of the center the indicator is appearing.

A description will now be given of the instrument disclosed in Figures 7 and 8. The casing containing the instrument may vary in shape if so desired, and be provided with a plane surface 40 to be placed in position upon any surface, the angle of which is to be determined. The operating elements of the instrument comprise the same form of pendulum 5—6 as disclosed in the instrument shown in Figures 1 and 2, and further provided with the same design of inverted pendulum 11—12. Gear sectors are provided and meshed together to join the simple pendulum and inverted pendulum together in operative relation. A solid cover plate 41 is inserted in the casing and covers the operating parts. The upper shaft 42 supporting the pendulum member 5—6 is provided with an extended journal 43 projecting through the bracket and cover plate. The extension 43 is fitted with an indicating hand 44, and graduated marks are engraved upon the cover plate concentric with the shaft of the swinging hand.

Figure 10:
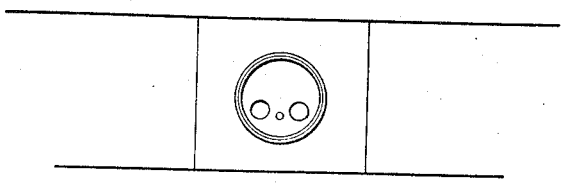
Figure 10 shows a front diagrammatical view of the instrument as applied to an airplane.

In the use and operation of the instrument as a banking indicator it will be installed on the instrument board of an airplane in a position similar to that shown diagrammatically in Figure 10. The view openings will be located symmetrically about the vertical center-line of the instrument and the axes of the simple and of the inverted pendulums will lie on the vertical center line of the instrument, when the airplane in which it is installed is in a horizontal position. In this position the pendant 6 or the disc 28 will not be exposed.

When the airplane moves out of its normally horizontal position through a very slight angle, the indicating means of the instrument appears in view, having a greater angular displacement than the angular movement of the plane.

To understand the functioning of the instrument, suppose the airplane to have moved through a slight angle C clockwise, carrying with it the case of the instrument which is now in the position shown in Figure 4. The axes of the simple and inverted pendulums are now moved out of the vertical through the angle C. The force acting upon the instrument, that is gravity, remains vertical. The simple pendulum now tends to stay vertical, but the inverted pendulum, having been disturbed from its vertical position tends to turn completely over and hang vertically downward. As the two pendulums are interconnected, neither can take the position which of itself it would assume, but they take up intermediate positions where the tendency of the simple pendulum to hang vertical just balances the tendency of the inverted pendulum to turn over. For a given relation between the pendulous factors of the two pendulums, this position is that shown as occupied by the pendulum head in Figure 4. This action on the part of the opposing pendulous members is the same for each direction of rotation of the case of the instrument.

In the functioning of the instrument just discussed, the force whose direction was indicated was gravity, but the instrument will obviously function in an identical manner in relation to any force or combination of forces which may act upon it. The angular displacement of the pendulums for a given angular displacement of the force acting upon them may be varied by varying the relation between their pendulous factors, the adjustable weight 14 being provided for that purpose.

In certain applications of this instrument, for example its use on an aeroplane the indication must be given in spite of severe external vibrations which are transmitted to it. In order that these vibrations may not cause the pendulums to oscillate, the cylinder and piston elements disclosed in Figures 5 and 6 are employed. During relative motion between the simple pendulum 26 and the inverted pendulum 30, the piston 36 will undergo a reciprocating movement in the cylinder 34. The displacement of air between the piston and the closed end of the cylinder offers a resistance to movement which prevents oscillations but which permits the pendulums to move freely under the influence of the forces whose directions it is desired to indicate.

Figure 3 shows the normal inactive position of the interconnected pendulums, and the dotted lines thereof disclose a newly assumed position due to the application of a lateral force.

Used as a banking indicator, this instrument will remain inactive so long as the airplane maintains its "correct lateral attitude" as heretofore explained. As the relation between the pendulous factors of the two pendulums can be adjusted to give any desired degree of magnification of the incorrectness of attitude, the instrument when properly adjusted will indicate in its incipiency any deviation from the correct lateral attitude, and the warning indication will appear before the human senses can detect the error, or detect that the airplane is beginning to assume a dangerous flight position.

When an airplane makes a turn the pendulums will remain in perfectly balanced position if the aviator holds his plane to a correct turning position. But if he overbanks or under-banks his machine the instrument will begin to indicate in either one of the view openings or the other and thus provides dependable indicating means for informing the aviator of the position of his plane during the turn.

Thus the aviator will aim to so control his plane that the indicating means will not appear, knowing that he is then maintaining his machine in the proper lateral attitude whether flying on a straight or curved path. As a means of impressing upon the mind of the aviator that the indicating pendant should not appear the phrase "Keep it dark" may be marked upon the face of the instrument.

This instrument will fill a long-felt want in aerial navigation, and supply the pilot with correct flying data instantly available by looking upon the dial of the banking indicator.

Having thus described my invention, what I claim as new, and desire to secure by Letters Patent is:

1. An instrument for indicating the direction of forces, comprising a simple pendulum, a gear attached thereto, an inverted pendulum, and a gear carried by the inverted pendulum meshing with the first named gear.

2. An instrument for indicating the direction of forces, comprising a casing with view openings, a simple pendulum pivoted therein, an inverted pendulum pivoted therein, means for operatively connecting said pendulums, and indicating means actuated by the pendulums and seen through the view openings during an indication.

3. An instrument for indicating the direction of forces, as a banking indicator for airplanes, comprising a casing with view openings, a simple pendulum pivoted therein, an inverted pendulum pivoted therein, means for operatively connecting said pendulums, indicating means actuated by the pendulums, and means for damping the oscillations of said pendulums.

4. An instrument for indicating the direction of forces, comprising a casing having view openings, a pendulum pivoted in the casing, a second pendulum associated with the first pendulum, and one of the aforesaid pendulums adapted to swing across the view openings to produce an indication when a force is applied to the instrument.

5. An instrument for indicating the direction of forces, comprising a casing provided with view openings, a simple pendulum mounted in the casing, an inverted pendulum mounted in the casing and associated with the first named pendulum, and one of the pendulums arranged to pass in front of the view opening to give an indication of the direction of force applied to the instrument.

6. An instrument for indicating the direction of forces, comprising an instrument casing provided with view openings through which an indication may be observed, a pendulum pivoted in the casing, a disk carried on the pendulum having substantially the same contour as the view openings in the instrument casing, and means related with the pendulum to multiply the movement of the pendulum relatively to the force applied to the instrument.

7. An instrument for measuring forces, comprising an instrument casing having view openings, a pendulum pivoted in the instrument casing and arranged to swing across the view openings to expose the pendulum through said view openings, and means related with the pendulum for greatly multiplying the movement of the pendulum relatively to the applied force to be indicated.

8. An instrument for indicating the direction of forces, comprising a simple pendulum, an inverted pendulum, a pin fixed to one of the pendulums and slidably engaging the other pendulum to join both pendulums together in operative relation, and indicating means carried by one of the pendulums to indicate the direction of applied force.

9. An instrument for indicating direction of forces comprising a pendulum, an indicator worked by the pendulum, and another pendulum and means connecting it with the first named pendulum in such a manner as to multiply the movement of the first named pendulum, and indicating means actuated by the pendulums.

10. An instrument as defined in claim 9, and being provided with means for varying the multiplying function of the pendulums.

11. A navigating instrument comprising, a casing, an indicator mounted therein, operating mechanism to work the indicator and controlled by force applied to the instrument, and means connected with the operating mechanism for increasing the movement of the indicator when the force is applied.

12. An instrument for indicating the direction of forces, comprising a pair of pendulums swung to pivot in opposition one to the other, and means so connecting them together that the movement of one pendulum acts against the other, and an indicator actuated by the pendulums to sensitively show an indication when a force is applied to the instrument.

13. An instrument for indicating the directions of forces, comprising a pendulum pivoted to swing in a depending position, another pendulum pivoted in an inverted position, a slot and pin connection made between the pendulums whereby the movement of one is transmitted to the other, and a suitable indicator operated by the movement of the pendulums.

14. A navigating instrument comprising, a casing, an indicator mounted therein, operating mechanism to work the indicator and controlled by force applied to the instrument, and an inverted pendulum connected with the operating mechanism for increasing the movement of the indicator when the force is applied.

15. A navigating instrument comprising, a casing, an indicator including a view opening provided in the casing and a shutter movable back and forth across the view opening, operating mechanism to work the indicator and controlled by force applied to the instrument, and means connected with the operating mechanism for increasing the movement of the indicator when the force is applied.

In testimony whereof I affix my signature.

CHARLES H. COLVIN.